Patented June 17, 1930

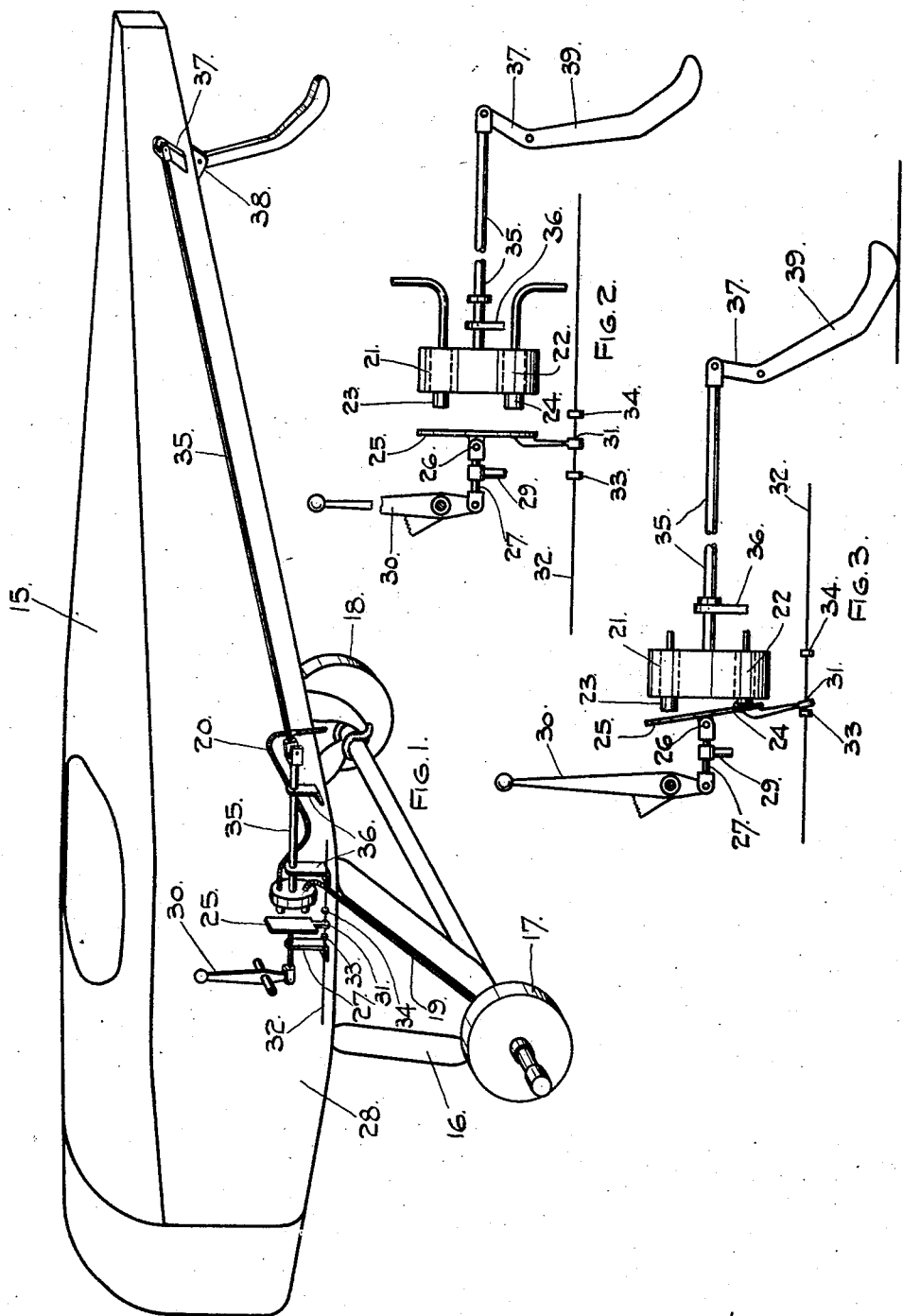

1,763,985

UNITED STATES PATENT OFFICE

WILFRID THOMAS REID, OF ST. LAURENT, QUEBEC, CANADA, ASSIGNOR TO CURTISS-REID AIRCRAFT COMPANY LIMITED, OF MONTREAL, QUEBEC, CANADA

MEANS FOR OPERATING ALIGHTING-GEAR BRAKES

Application filed December 3, 1928. Serial No. 323,494.

The invention relates to means for operating alighting gear brakes, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to facilitate the control of an aeroplane during the operation of landing and while taxying and manœuvring on the ground; to afford safety for the machine and aviator by the introduction of automatic mechanism for maintaining the brakes in their released positions until the machine has properly landed; to adapt the principle of the operation of this mechanism to all forms of brakes, adaptable to landing carriages; to eliminate nosing into the ground through the untimely application of the brakes; to produce a mechanism for the carrying out of the aforesaid purposes at a comparatively low initial cost and also at a low cost for maintenance, so that all machines may be readily supplied with the device without any material increase in the expense of construction, and thus avoid the occurrence of many deplorable accidents frequently happening in landing operations and generally to provide an efficient brake operating mechanism particularly adaptable to the application and release of brakes in landing gear for aeroplanes.

In the drawings, Figure 1 is a perspective view of an aeroplane showing an outline of a brake operating mechanism according to this invention.

Figure 2 is an elevational view of the operating mechanism, showing the skid idle.

Figure 3 is an elevational view showing the skid applied.

Like numerals of reference indicate corresponding parts in the various figures.

Referring to the drawings, an aeroplane is indicated by the numeral 15, and the landing carriage by the numeral 16, while the brake drums are indicated by the numerals 17 and 18, and these brake drums contain the brake application mechanisms as usual, as there is not in this invention supposed to be any change in this part of the operating means, and for convenience in description and with a view of adopting the more modern practice in the art, the description of the invention will be confined to the actuating of the operating means in the drums by hydraulic methods, otherwise by oil cylinders and plungers, so it may be taken for granted that the means for actually operating the levers within the drums are already there, and what is proposed in this invention is to introduce in the flexible oil pipes 19 and 20, leading to the drums and the operating mechanism therewithin, a pair of oil cylinders 21 and 22 in a suitable block and having the plungers 23 and 24 respectively.

The rocking bar 25 is centrally and pivotally secured by the pivot 26 to the end of the connecting rod 27 within the fuselage 28, and said rod is slidably mounted in the bearing bracket 29.

The operating lever 30 is pivotally mounted and operatively connected to said rod 27, so through said lever the rocking bar may be brought into contact with the plungers 23 and 24, so as to bring the oil pressure in contact with the application mechanisms of the brakes.

The rocking bar is extended at one end and has an orifice 31 and for manœuvring and taxying one of the rudder cables or rods 32 extends through the orifice 31 in the extended end of the rocking bar 25, which is between the stops 33 and 34, fixedly secured on the cable or rod, so that on operating said cable or rod to move the rudder, the stop 33 or the stop 34 is brought into engagement with the bar 25 and rocks it to bring it into engagement with one or other of the plungers 23 or 24, thereby applying a single brake on the one side or on the other, as the case may be, which effects the turning of the machine in the direction desired.

The cylinder block containing the cylinders 21 and 22 is secured to the shaft 35, slidably mounted in the bearings 36 and pivotally secured to the crank lever 37, which in itself is pivotally secured at its angle in the bearing bracket 38 fixedly secured in the tail of the machine.

The section 39 of the crank lever 37 extends into the skid 40, which has a very important bearing on the operation of this invention, for as soon as the skid rests on the ground, the cylinder block is moved forwardly into operating position in relation to the rocking bar 25, but with the skid hanging idle the cylinder block slides to its rear position out of operating reach of the bar 25.

In the operation of this invention the aviator on landing from a flight and desiring to bring his machine to a stop applies the brakes by means of his hand lever, to the extent desired, and in effecting the application of the brakes, it will be noticed that in this invention, the brakes cannot be applied unless the skid is in contact with the ground, that is to say, the tail of the machine must be dragging along the ground, on the skid, and if at any time it leaves the ground then the cylinder block will slide rearwardly out of reach of the operating bar.

It will thus be seen that the bar cannot effect the application of the brakes, so long as the skid is away from the ground, therefore, there is no possibility of bringing the nose of the machine to the ground through inopportune operation of the brake lever, but just as soon as the tail is regularly trailing, the brakes may be applied in the manner chosen by the expert aviator, so that the whole machine can be brought to a stand without accident.

When it is desired to taxy or manœuvre into position, the rudder is operated bringing one of the stops on the rudder cable or rod into contact with the rocking bar, so that one plunger is operated, meaning that the brakes are applied on one wheel only and this swings the machine around to the extent required and by operating one or other of the brakes at a time, the machine can be brought into its chosen position or stall.

The hydraulic means of operating the brakes is perhaps the most effective and certainly is very suitable for this invention, but it may be stated that the mechanical operation where the brakes are not hydraulic will prove quite feasible, and in that case, the plungers may be replaced by bell cranks, wheels, or other forms of levers and brought into operating connection with another member replacing the present operating bar, though it will have exactly the same functions, one of the salient features of the present invention being the automatic means employed for withdrawing the actuating member from operating distance by means of the skid, and another being the coincident operation of the brakes respectively with the operation of the rudder.

What I claim is:

1. A brake operating mechanism comprising a cylinder block having cylinders and plungers and flexible connections to brake application mechanisms, a tail skid operatively connected to the cylinder mounting and levers for operating said plungers.

2. A brake operating mechanism comprising a cylinder block having cylinders and plungers and flexible connections to brake application mechanisms, a shaft slidably mounted in the fuselage of a machine and carrying said cylinder block, a crank lever pivotally mounted in the tail of the machine and operatively connected to said shaft and a tail skid extending therefrom and levers operating said plungers.

3. A brake operating mechanism comprising a cylinder block having cylinders and plungers and flexible connections to brake application mechanisms, a pivotally mounted tail skid and shaft reciprocated thereby and supporting said block and hand and foot levers for operating said brakes through said plungers cylinders and flexible connections.

4. A brake operating mechanism comprising a cylinder block having cylinders and plungers and flexible connections to brake application mechanisms, a rocker bar engaging said plungers, a lever mechanism carrying said rocker bar, a steering cable having spaced operating stops, a lever engaging said cable between said stops and secured to said rocker bar, and a cylinder block having cylinders connected to the application mechanisms and plungers therein engaged together by said rocker bar or singly in manœuvring movements.

5. A brake operating mechanism comprising a cylinder block having cylinders and plungers and flexible connections to brake application mechanisms, brake operating members for stopping and manœuvering movements, and means for operating the brake applying mechanisms together or singly, said means being dependent in its operation on the contact of the tail skid with the ground.

Signed at Montreal, Canada, this 25th day of October, 1928.

WILFRID THOMAS REID.